(12) United States Patent
Anand et al.

(10) Patent No.: US 8,170,019 B2
(45) Date of Patent: May 1, 2012

(54) CPU TRANSMISSION OF UNMODIFIED PACKETS

(75) Inventors: Anupam Anand, Newark, CA (US); John Jeffrey Dull, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 482 days.

(21) Appl. No.: 11/090,143

(22) Filed: Mar. 28, 2005

(65) Prior Publication Data

US 2006/0114895 A1   Jun. 1, 2006

Related U.S. Application Data

(60) Provisional application No. 60/631,550, filed on Nov. 30, 2004.

(51) Int. Cl.
H04L 12/28 (2006.01)
(52) U.S. Cl. .......................... 370/392; 370/474
(58) Field of Classification Search .................. 370/299, 370/386, 392, 389, 390, 398, 401, 404, 412, 370/413, 414, 415, 416, 417, 418, 419, 420, 370/422, 423, 428, 429, 432, 473, 474
See application file for complete search history.

(56) References Cited

U.S. PATENT DOCUMENTS

| | | | | |
|---|---|---|---|---|
| 4,742,511 | A * | 5/1988 | Johnson | 370/406 |
| 5,297,239 | A * | 3/1994 | Kurosawa et al. | 706/59 |
| 5,940,392 | A * | 8/1999 | Lo et al. | 370/392 |
| 6,259,699 | B1 * | 7/2001 | Opalka et al. | 370/398 |
| 6,272,134 | B1 * | 8/2001 | Bass et al. | 370/390 |
| 6,680,945 | B1 * | 1/2004 | Merchant et al. | 370/395.53 |
| 6,683,865 | B1 * | 1/2004 | Garcia-Luna-Aceves et al. | 370/349 |
| 6,778,547 | B1 * | 8/2004 | Merchant | 370/422 |
| 6,842,429 | B1 * | 1/2005 | Shridhar et al. | 370/252 |
| 7,116,680 | B1 * | 10/2006 | Kramer et al. | 370/465 |
| 7,466,703 | B1 * | 12/2008 | Arunachalam et al. | 370/392 |
| 2001/0043614 | A1 * | 11/2001 | Viswanadham et al. | 370/469 |
| 2003/0002503 | A1 * | 1/2003 | Brewer et al. | 370/392 |
| 2003/0118019 | A1 * | 6/2003 | Mark et al. | 370/392 |
| 2003/0123452 | A1 * | 7/2003 | Cox et al. | 370/395.43 |
| 2003/0202510 | A1 * | 10/2003 | Witkowski et al. | 370/386 |
| 2004/0156368 | A1 * | 8/2004 | Barri et al. | 370/395.63 |
| 2004/0165590 | A1 * | 8/2004 | Reiner et al. | 370/392 |
| 2004/0190533 | A1 * | 9/2004 | Modi et al. | 370/400 |
| 2005/0100025 | A1 * | 5/2005 | Nagami et al. | 370/396 |
| 2005/0226253 | A1 * | 10/2005 | Parker et al. | 370/395.42 |
| 2005/0243827 | A1 * | 11/2005 | Rhoades | 370/392 |
| 2005/0281286 | A1 * | 12/2005 | Wang et al. | 370/469 |
| 2006/0002424 | A1 * | 1/2006 | Gadde | 370/469 |
| 2006/0013214 | A1 * | 1/2006 | Cameron et al. | 370/389 |
| 2006/0023718 | A1 * | 2/2006 | Joly | 370/392 |
| 2006/0029104 | A1 * | 2/2006 | Jungck | 370/498 |
| 2006/0035603 | A1 * | 2/2006 | Al-Adnani | 455/90.2 |
| 2006/0106628 | A1 * | 5/2006 | Faherty et al. | 705/1 |

(Continued)

*Primary Examiner* — Chi Pham
*Assistant Examiner* — Abdullah Riyami

(57) ABSTRACT

A network device for processing packet. The network device includes an ingress module for performing switching functionality on an incoming packet, wherein the network device determines a destination port to which the incoming packet is to be transmitted. The network device also includes a CPU processing module for transmitting information between the network device and an external CPU. The external CPU transmits a formatted packet to the network device through the CPU processing module. The formatted packet includes module header and a data field. The ingress module uses information in a start field of the module header to determine that the incoming packet is a formatted packet and generates instructions for notifying other modules of the network device that the formatted packet is not to be modified by the network device and determines that the formatted packet is to be transmitted to a destination field in the formatted packet.

17 Claims, 5 Drawing Sheets

U.S. PATENT DOCUMENTS

| | | |
|---|---|---|
| 2006/0114900 A1* | 6/2006 | Kalkunte et al. .............. 370/389 |
| 2006/0114905 A1* | 6/2006 | Anand et al. ................... 370/392 |
| 2006/0114907 A1* | 6/2006 | Wu .............................. 370/392 |
| 2006/0114908 A1* | 6/2006 | Kalkunte et al. .............. 370/392 |
| 2006/0114912 A1* | 6/2006 | Kwan et al. ................. 370/395.4 |
| 2006/0114914 A1* | 6/2006 | Anand et al. ............. 370/395.53 |
| 2006/0114915 A1* | 6/2006 | Kalkunte et al. ......... 370/395.53 |
| 2006/0209840 A1* | 9/2006 | Paatela et al. .............. 370/395.7 |
| 2006/0209897 A1* | 9/2006 | Joung .......................... 370/474 |
| 2006/0239273 A1* | 10/2006 | Buckman et al. ........ 370/395.41 |
| 2006/0274755 A1* | 12/2006 | Brewer et al. ................. 370/392 |
| 2007/0113046 A1* | 5/2007 | Vorbach et al. ................. 712/15 |
| 2007/0143598 A1* | 6/2007 | Partridge et al. .............. 713/160 |
| 2007/0198694 A1* | 8/2007 | Nishino et al. ................ 709/224 |
| 2007/0198897 A1* | 8/2007 | Schroeder .................... 714/776 |
| 2007/0220170 A1* | 9/2007 | Abjanic et al. ................ 709/246 |
| 2008/0044183 A1* | 2/2008 | Perkins et al. .................. 398/58 |
| 2009/0103536 A1* | 4/2009 | Basso et al. ................... 370/392 |

* cited by examiner

CPU TRANSMISSION OF UNMODIFIED PACKETS

This application claims priority of U.S. Provisional Patent Applications Ser. No. 60/631,550, filed on Nov. 30, 2004. The subject matter of the earlier filed application is hereby incorporated by reference.

BACKGROUND OF THE INVENTION

1. Field of the Invention

The present invention relates to a method of transmitting a packet from a computer processing unit (CPU) to any port on a network device and more particularly to a method of transmitting an unmodified packet to a port specified by the CPU.

2. Description of the Related Art

A switching system may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

According to current architecture, the device includes input ports for receiving packets from external modules and/or CPUs. All information entering the device from any one of these ports is transmitted to the ingress module where switching logic is applied to the packet to determine to which port the packet should be directed. After the ingress module determines to which port the packet should be directed, the packet is modified with the appropriate switching information and the packet is transmitted to the destination port identified by the ingress module through the MMU and the egress module.

However, a packet entering the device from the CPU may already include destination port information that identifies to which port the packet should be directed. As such, if the packet is processed in the ingress module, the ingress module may provide a different destination port from the destination port that is already identified in the packet. This will in effect cause the packet to be routed to the destination port provided by the ingress module. Furthermore, a packet may need to be transmitted from the CPU to a specific destination port without having the internal processing, switching and/or modification functions of the device applied to the packet. As such, there exists a need for providing a device that transmits an unmodified and unconstrained packet to a destination port specified by the CPU, wherein the packet is not subjected to any switching or drops, other than resource drops in the device.

BRIEF SUMMARY OF THE INVENTION

According to one aspect of the invention, there is provided a network device for performing switching and other functions on packets transmitted through the switching chip. The network device includes an ingress module for performing switching functionality on an incoming packet, wherein the network device determines a destination port to which the incoming packet is to be transmitted. The network device also includes a CPU processing module for transmitting information between the network device and an external CPU, wherein the external CPU transmits a formatted packet to the network device through the CPU processing module. The formatted packet includes module header and a data field. The ingress module uses information in a start field of the module header to determine that the incoming packet is a formatted packet and generates instructions for notifying other modules of the network device that the formatted packet is not to be modified by the network device and determines that the formatted packet is to be transmitted to a destination field in the formatted packet.

According to another aspect of the invention, there is a method for processing a packet on a network device. The method includes the steps of receiving an incoming packet from an external CPU, wherein the incoming packet includes a module header and a data field and using information in a start field of the module header to determine that the incoming packet is a formatted packet. The method also includes the steps of generating instructions for notifying modules of the network device that the formatted packet is not to be modified by the network device and determining a destination port to which the formatted packet is to be transmitted based on a destination field in the formatted packet.

According to another aspect of the invention, there is provided an apparatus for processing a packet in a network device. The apparatus includes receiving means for receiving an incoming packet from an external CPU, wherein the incoming packet includes a module header and a data field and using means for using information in a start field of the module header to determine that the incoming packet is a formatted packet. The apparatus also includes generating means for generating instructions for notifying modules of the network device that the formatted packet is not to be modified by the switching chip. The apparatus further includes determining for determining a destination port to which the formatted packet is to be transmitted based on a destination field in the formatted packet.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS OF THE INVENTION

Reference will now be made to the preferred embodiments of the present invention, examples of which are illustrated in the accompanying drawings.

Figure 1:
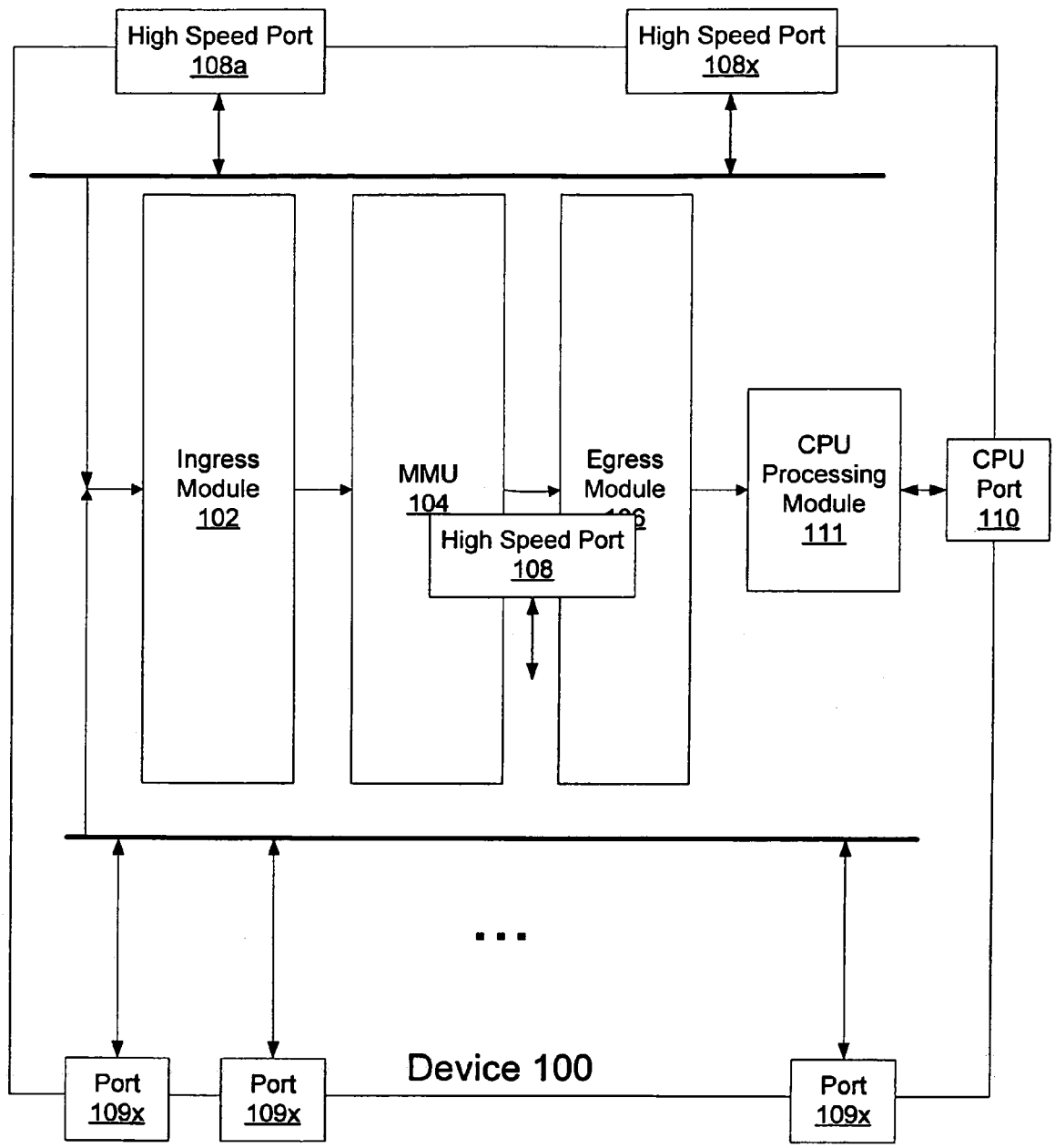
FIG. 1 illustrates a network device in which an embodiment the present invention may be implemented.

FIG. 1 illustrates a network device, for example a switching chip, in which an embodiment the present invention may be implemented. Device 100 implements a pipelined approach to process incoming packets and includes an ingress module 102, a MML 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module.

Device 100 may also include one or more internal fabric high speed ports, for example a HiGig ports, 108a-108x, one or more external Ethernet port 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Chip 100 interfaces with external/off-chip CPUs through a CPU processing module 111, such as a CMIC module, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports physical Ethernet ports and logical (trunk) ports. A physical Ethernet port is a physical port on device 100 that is globally identified by a global port identifier. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109j-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Figure 2A:
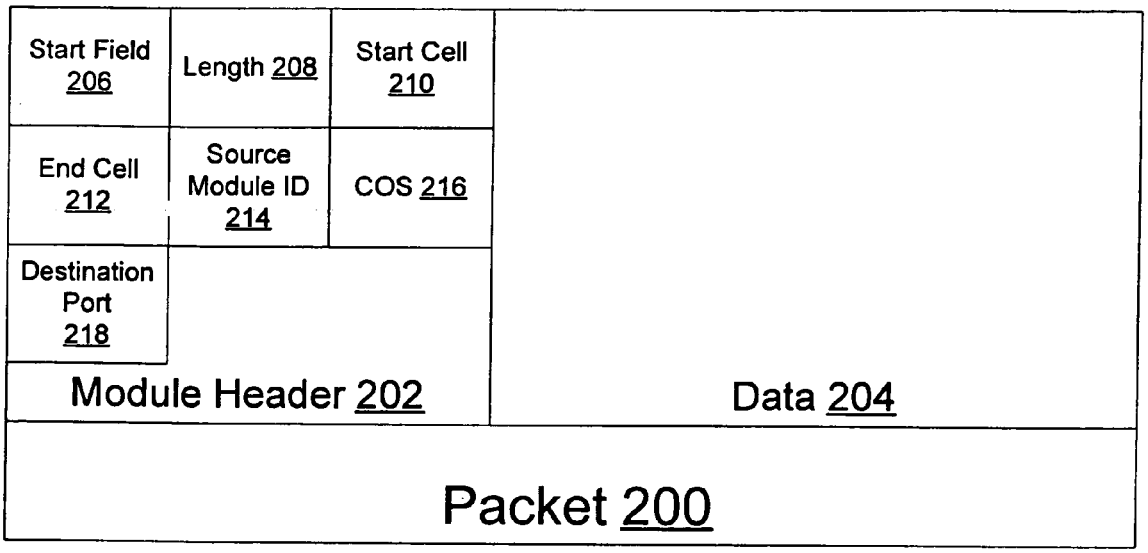
FIG. 2a illustrates an embodiment of a formatted packet from the CPU to the network device.

According to one embodiment of the invention, software associated with an external CPU generates a formatted packet for transmission through device 100. The CPU then sends the formatted packet through CPU processing module 111 to ingress module 102. FIG. 2a illustrates an embodiment of the formatted packet from the CPU to device 100. The formatted packet 200 includes a module header 202 and data field 204. Module header 202 is a 96 bit field that includes a start field 206, a cell length field 208, a Start cell of Packet field 210, an End cell of Packet field 212, a source module ID field 214 and Class of Service (COS) field 216 and a local destination port field 218. According to an embodiment of the invention, start field 206 is programmed to 8'hFF to indicate that the associated packet is a formatted packet that should not be modified in device 100. Source module ID field 214 is programmed to disable MMU 104 from performing certain checks on packet 200. COS field 216 indicate the class of service to which the packet belongs. Local destination port field 218 indicate to which local port packet 200 should be directed.

Figure 2B:
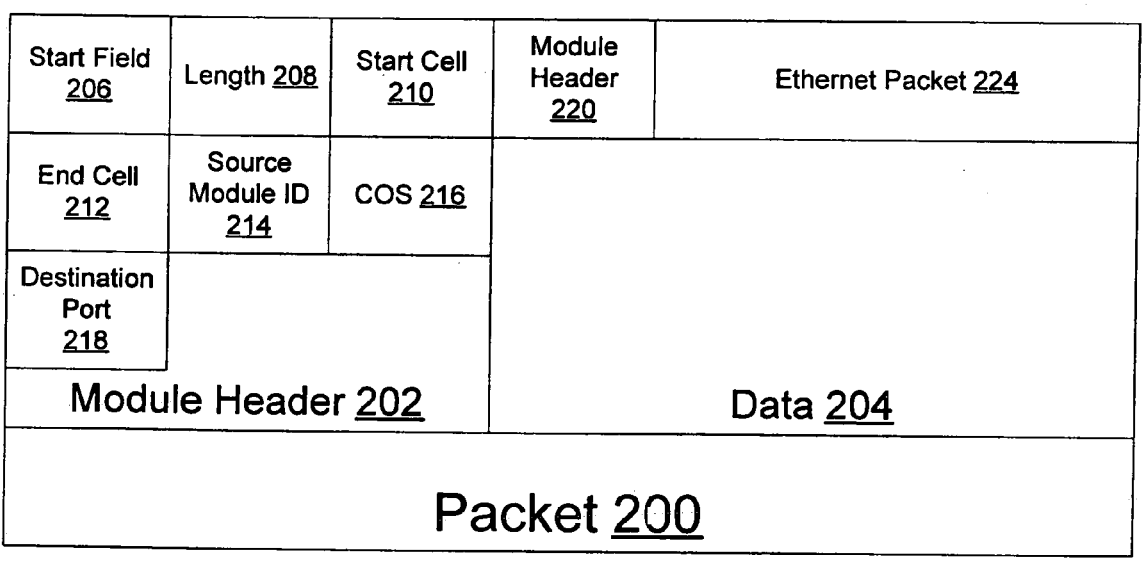
FIG. 2b illustrates an embodiment of a formatted packet that is transmitted from the CPU to an internal fabric port.

Data field 204 includes information that is appropriate to the destination port to which the packet is being transmitted. For example, if formatted packet 200 is to be transmitted to an Ethernet port, then data field 204 will include an Ethernet packet. Additionally, if the CPU is transmitting a tagged packet out of the Ethernet port, data field 204 must include a Virtual LAN (VLAN) tag. On the other hand, if the CPU is transmitting an untagged packet, then data field 204 must not include the VLAN tag. In another example, if formatted packet 200 is to be transmitted to a high speed port, then the CPU includes a final Module Header 220 and an Ethernet Packet 224, as illustrated in FIG. 2b, in data field 204. Final Module Header 220 is a module header that is transmitted on the high speed port and final module header 220 is stored in the first 12 bytes of data field 204 and is followed by Ethernet packet 224.

In an embodiment of the invention, after the software associated with the CPU generates formatted packet 200, the CPU transfers formatted packet 200 to device 100 on a 32 bit wide bus between CPU processing module 111 and ingress module 102 in three cycles.

Figure 3:
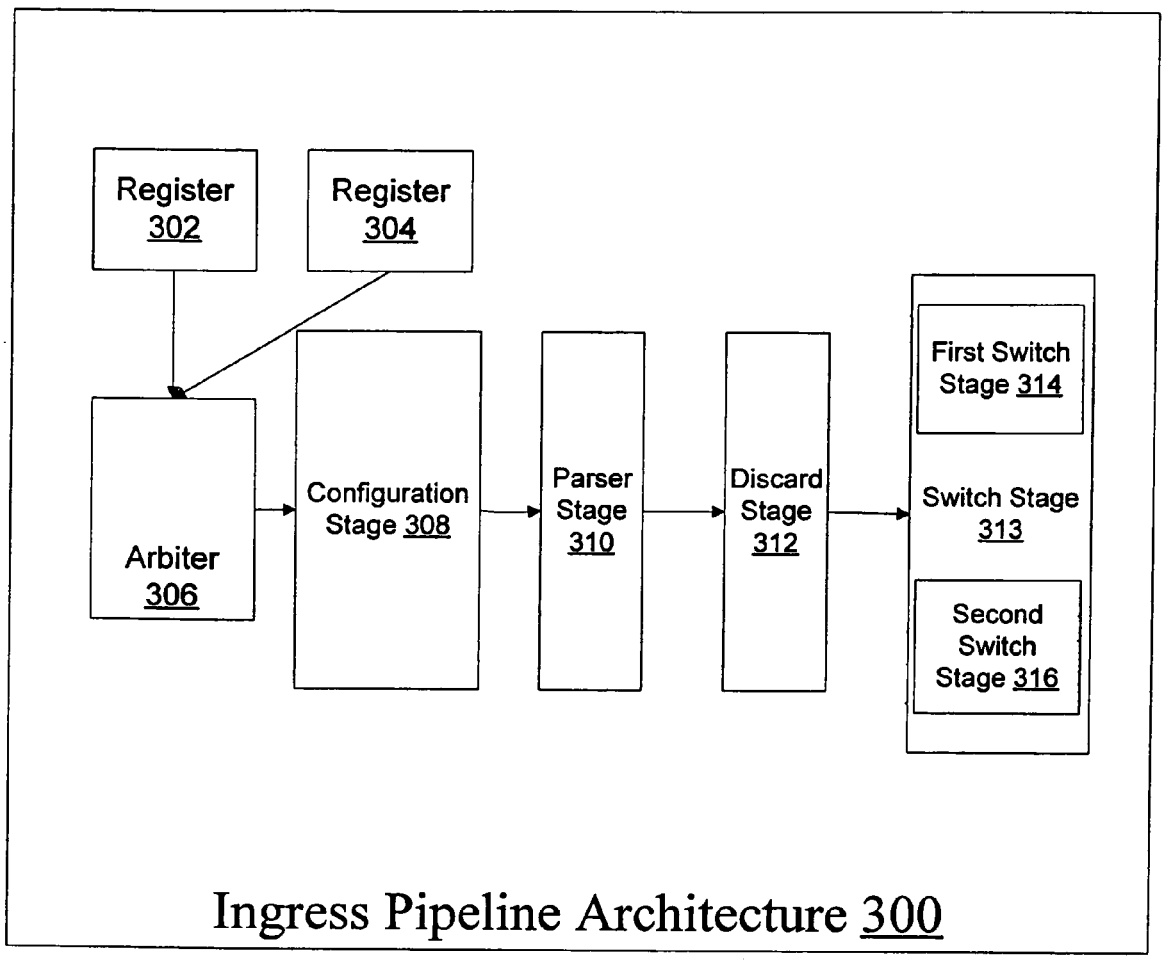
FIG. 3 illustrates an embodiment of a centralized ingress pipeline architecture of the ingress module.

FIG. 3 illustrates an embodiment of the centralized ingress pipeline architecture 300 of ingress module 102. Ingress pipeline 300 processes incoming packets, primarily determines an egress bitmap and, in some cases, determines which parts of the packet may be modified. Upon receiving formatted packet 200, ingress module 102 uses the information stored in start field 206 to distinguish module header 202 from a standard module header of a standard packet. According to FIG. 3, ingress pipeline 300 includes a data holding register 302, a module header holding register 304, an arbiter 306, a configuration stage 308, a parser stage 310, a discard stage 312 and a switch stage 313. When ingress pipeline 300 receives packet 200 from CPU processing module 111, ingress pipeline stores the cell data in data holding register 302. Arbiter 306 is responsible for scheduling requests from CPU processing module 111. Configuration stage 308 is used for setting up a table with all major port-specific fields that are required for switching. Parser stage 310 parses the incoming packet and a high speed module header, if present. Discard stage 312 looks for various early discard conditions and either drops the packet and/or prevents it from being sent through pipeline 300. Switching stage 313 performs all switch processing in ingress pipeline 300.

According to one embodiment of the invention, data holding register 302 accumulates the incoming data into one contiguous 128-byte cell prior to arbitration and the module header register 304 stores an incoming 96-bit module header 202. Ingress pipeline 300 multiplexes signals from each of port 109a-109i and CPU processing module 111 based on which source is granted access to ingress pipeline 300 by arbiter 306. When arbiter 306 receives information from register buffer 302, arbiter 306 may issue at least one of a packet operation code, an instruction operation code or a FP refresh code, depending on resource conflicts. Based on the value in start field 206, arbiter 306 identifies the incoming packet as a formatted packet from CPU processing module 111. Specifically, when start field 206 is set to 8'hFF, arbiter 306 handles packet 200 in a special mode and sends packet 200 down the ingress pipeline with an instruction that indicates that the packet should be unmodified.

Arbiter 306 also sets the instruction operation code to an un-modify packet code but arbiter 306 will not set any of the standard code signals for configuration stage 308, parser stage 310, discard stage 312 and switch stage 313. As such, even though packet 200 is transmitted through pipeline 300, it is not processed as a standard packet in the stages of pipeline 300. Arbiter 306 then sends unmodified module header 202 and data field 204 through pipeline 300 to the end of switch stage 313 over an overlay bus and a packet data bus.

Parser stage 310 manages an ingress pipeline buffer which holds the 128-byte cell as lookup requests traverse pipeline 300. When the lookup request reaches the end of pipeline 300, the data is pulled from the ingress pipeline buffer and sent to MMU 104. As packet 200 is transmitted through pipeline 300, parser stage 310 copies data field 204 into a cell buffer that is associated with the un-modify packet instruction and passes a write pointer down pipeline 300. Since the packet data is written to the ingress pipeline buffer, the packet data need not be transmitted further.

Switching stage 313 performs address resolution processing and other switching on incoming packets. According to an embodiment of the invention, switching stage 313 includes a first switch stage 314 and a second switch stage 316. When the un-modify packet instruction is received by second switch stage 316, it sends signals back to parser stage 310 to read the packet data from the cell buffer. Second switch stage 316 also tables module header 202 fields, which were sent over the overlay bus and constructs PBI fields.

Figure 4:
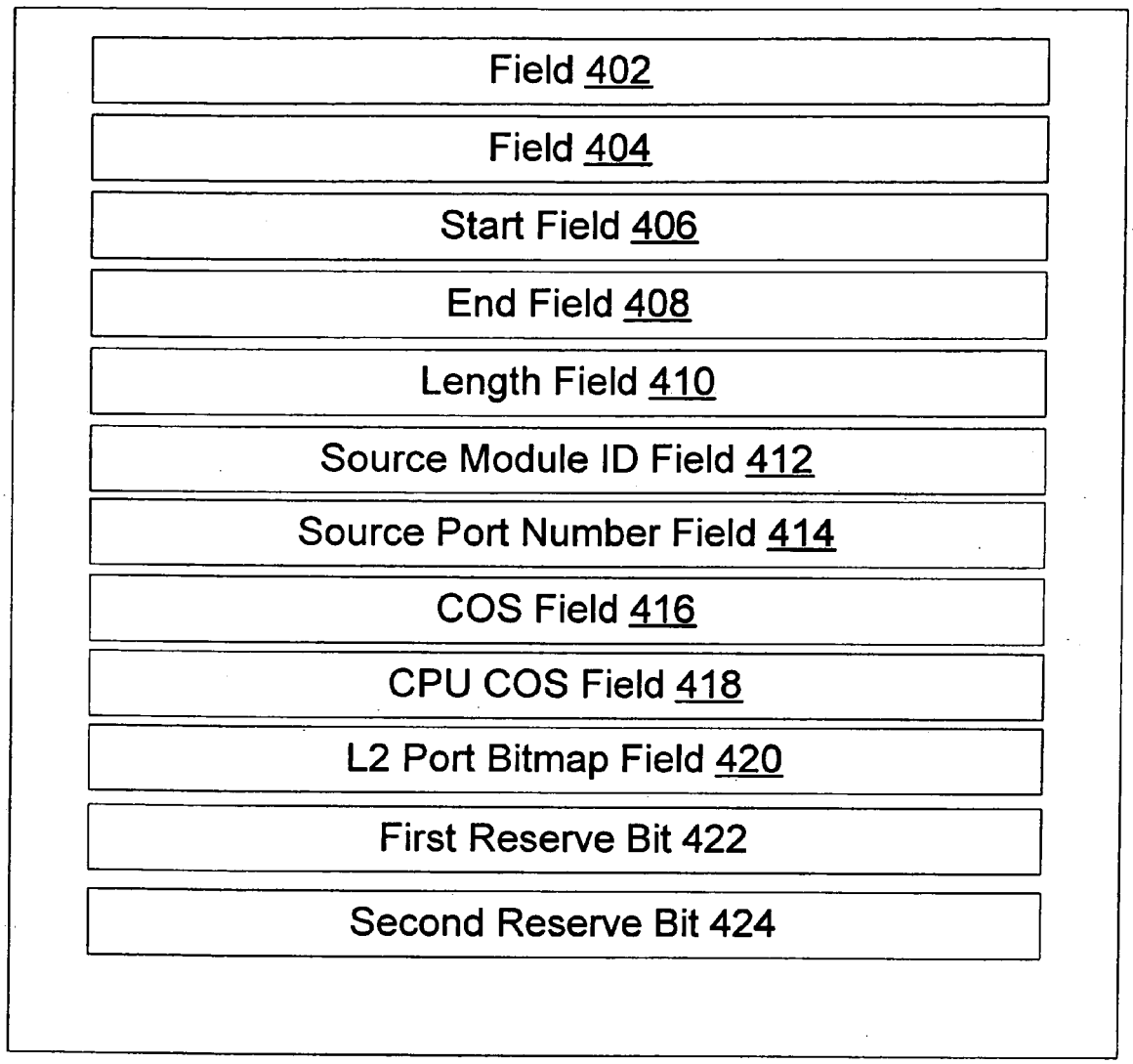
FIG. 4 illustrates PBI fields constructed by a second switch stage.

FIG. 4 illustrates the PBI fields constructed by second switch stage 316. The PBI fields includes at least a valid field 402, a PBM_Valid field 404, a start field 406, an end field 408, a cell length field 410, a source module id field 412, a source port number field 414, a class of service (COS) field 416, a CPU COS field 418, a L2 port bitmap field 420, a first reserve bit 422 and a second reserve bit 424. All of the PBI fields constructed by second switch stage 316 are zeroed except for fields 402-424. According to an embodiment of the invention, PBM_Valid field 404 is set when SOP field 210 is set to 1, start field 406 is set to SOP field 210, end field 408 is set to EOP field 212, source module id field 412 is set to source module ID field 214, COS field 416 is set to COS field 214, CPU COS field 418 is also set to COS field 214 and L2 port bitmap field 420 is set to local destination port field 218. PBM_Valid field 404, source module id field 412, COS field 416, CPU COS field 418, a L2 port bitmap field 420 are only set on Start Cell of Packet (SOP) cells. Ingress pipeline 300 then passes the PBI fields along with the data field 204 to MMU 104 on a CBI bus.

MMU 104 then applies all resource accounting and aging logic to packet 200. Specifically MMU 104 uses a source port number to perform resource accounting. MMU 104 also checks if the reserved bits are connected from ingress module 102 to egress module 106. MMU further uses source module id 214 to avoid certain flow checks and uses the source port number to perform resource accounting. Thereafter, MMU 104 forwards the packet to egress module 106.

Figure 5:
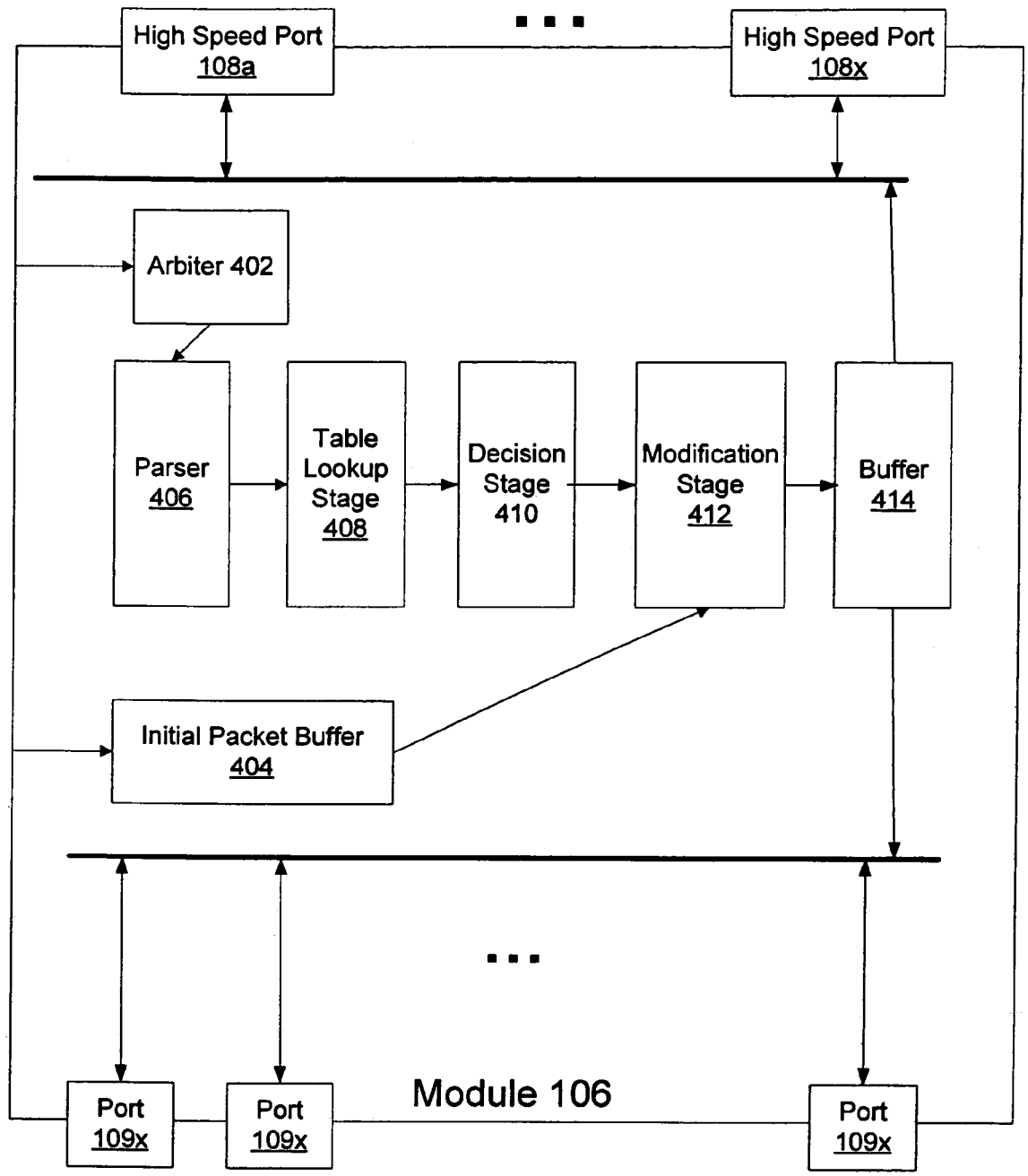
FIG. 5 illustrates an egress pipeline for the egress module.

Egress module 106 receives the packet from MMU and identifies the packet as a formatted packet by checking the values reserved bits 422 and 424. FIG. 5 illustrates an egress pipeline for egress module 106. Egress pipeline 500 includes an arbiter 502, parser stage 506, a table lookup stage 508, a decision stage 510, a modification stage 514 and a data buffer 516. Arbiter 502 provides arbitration for accessing egress pipeline 500 resources between packet data and control information from MMU 104 and information sent direct to the egress pipeline from the CPU. Parser stage 506 performs packet parsing for table lookup and modifications. Table lookup stage 508 performs table lookups for information transmitted from parser 506. Decision stage 510 is used for determining whether to modify, drop or otherwise process the packet. Modification stage 512 modifies the packet based on the determination of decision stage 510.

Upon receiving packet 200 from MMU 104, arbiter 502 constructs a new un-modify packet pipeline command for packet 200 and passes PBE fields through a pipeline bus using CPU operation overlay fields. Data field 204 then is then passed to a packet buffer by parser stage 506 and all table lookups and switching decisions are ignored in all stages of the egress pipeline. Modification stage 514 reads back data field 204 from the packet buffer and forwards data field 204 to data buffer 516. According to an embodiment of the invention, no packet modification is required on data field 204 and no alignment processing is executed. However, egress pipeline 500 will perform age, purge, or cell error operations on packet 200 if such operations are indicated by MMU 104. Data field 204 is then stored in the respective destination port buffers. If the outgoing port is a high speed port, module header 222 is already present in data field 204 and it is stored in the destination port buffers.

The foregoing description has been directed to specific embodiments of a network device. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus, comprising:
  a CPU processing module configured to receive a packet from an external CPU, wherein the received packet includes a header portion and a data portion, and wherein the header portion includes a field identifying the packet as a CPU formatted packet and a field indicating a local destination port determined by the external CPU;
  an ingress module configured to receive the packet from the CPU processing module, identify the packet as a CPU formatted packet, and issue an operation code indicating the packet may not be modified during processing by the apparatus; and
  an egress module configured to receive the packet from the ingress module and process the packet without modifying the packet; wherein the egress module is configured to determine whether to drop the packet or to send the packet to the local destination port determined by the external CPU.

2. The apparatus of claim 1, wherein the ingress module further comprises a discard stage configured to determine whether to drop the packet.

3. The apparatus of claim 1, wherein the ingress module is configured to receive packets from the CPU processing module and at least one ingress port, and further comprises an arbiter configured to schedule access to the CPU processing module.

4. The apparatus of claim 3, wherein the arbiter is configured to issue at least one of a packet operation code, an instruction operation code or a refresh code.

5. The apparatus of claim 1, further comprising a memory management unit configured to apply resource accounting and aging logic to the received packet.

6. The apparatus of claim 5, wherein the egress module receives the packet from the ingress module by way of the memory management unit.

7. The apparatus of claim 1, wherein all table lookups and switching decisions are skipped in the egress module.

8. A computer implemented method for processing packets in a network device, comprising:
  receiving an incoming packet from an external CPU, wherein the incoming packet includes a header portion and a data portion, and wherein the header portion includes a field identifying the packet as a CPU formatted packet and a field indicating a local destination port determined by the external CPU;

identifying the packet as a CPU formatted packet from the header portion and issuing an operation code for processing the packet, wherein the operation code indicates the packet may not be modified during processing; and processing the packet to determine whether to drop the packet or to send the packet to the local destination port determined by the external CPU.

9. The computer implemented method of claim 8, wherein processing the packet to determine whether to drop the packet further comprises applying resource accounting and aging logic to the packet.

10. The computer implemented method of claim 8, wherein the packet is received at an ingress module.

11. The computer implemented method of claim 8, further comprising storing the packet in a memory while it is being processed.

12. The computer implemented method of claim 8, wherein the packet is sent to the destination port determined by the external CPU through an egress module.

13. A computer program product, embodied on a non-transitory machine-readable medium, comprising instructions operable to cause a programmable processor to:

receive an incoming packet from an external CPU, wherein the incoming packet includes a header portion and a data portion, and wherein the header portion includes a field identifying the packet as a CPU formatted packet and a field indicating a local destination port determined by the external CPU;

identify the packet as a CPU formatted packet from the header portion and issue an operation code for processing the packet that indicates the packet may not be modified during processing; and process the packet to determine whether to drop the packet or to send the packet to the local destination port determined by the external CPU.

14. The computer program product of claim 13, wherein the instruction to process the packet to determine whether to drop the packet further comprises instructions to apply resource accounting and again logic to the packet.

15. The computer program product of claim 13, wherein the instruction to receive the packet comprises an instruction to receive the packet at an ingress module.

16. The computer program product of claim 13, further comprising an instruction to store the packet in a memory while it is being processed.

17. The computer program product of claim 13, wherein the instruction to send the packet to the destination port determined by the external CPU comprises an instruction to send the packet through an egress module.

* * * * *